United States Patent
Colignon

(10) Patent No.: US 7,340,885 B2
(45) Date of Patent: Mar. 11, 2008

(54) SYSTEM FOR ASSISTING THE REGENERATION OF DEPOLLUTION MEANS INTEGRATED IN AN EXHAUST LINE OF A DIESEL-ENGINED VEHICLE

(75) Inventor: Christophe Colignon, Levallois Perret (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/595,630
(22) PCT Filed: Oct. 13, 2004
(86) PCT No.: PCT/FR2004/002610

§ 371 (c)(1),
(2), (4) Date: May 1, 2006

(87) PCT Pub. No.: WO2005/047678

PCT Pub. Date: May 26, 2005

(65) Prior Publication Data
US 2007/0056269 A1 Mar. 15, 2007

(30) Foreign Application Priority Data
Nov. 7, 2003 (FR) .................................. 03 13155

(51) Int. Cl.
F01N 3/00 (2006.01)
(52) U.S. Cl. ........................ 60/295; 60/274; 60/285; 60/286; 60/297
(58) Field of Classification Search ................. 60/280, 60/284, 285, 286, 295, 297, 311
See application file for complete search history.

(56) References Cited

U.S. PATENT DOCUMENTS

| | | | |
|---|---|---|---|
| 6,289,672 B1 * | 9/2001 | Katoh et al. | 60/285 |
| 6,666,020 B2 * | 12/2003 | Tonetti et al. | 60/286 |
| 6,802,180 B2 * | 10/2004 | Gabe et al. | 60/285 |
| 6,966,179 B2 * | 11/2005 | Onodera et al. | 60/295 |
| 6,969,413 B2 * | 11/2005 | Yahata et al. | 55/282.3 |
| 7,021,050 B2 * | 4/2006 | Nishimura et al. | 60/295 |

FOREIGN PATENT DOCUMENTS

| | | |
|---|---|---|
| DE | 10007049 A | 8/2001 |
| DE | 10033159 A | 1/2002 |
| EP | 1281852 A | 2/2003 |

* cited by examiner

*Primary Examiner*—Binh Q. Tran
(74) *Attorney, Agent, or Firm*—Nicholas E. Seckel

(57) ABSTRACT

This system in which the depollution means (1) are associated with oxidation catalyst-forming means (2), and the engine (4) is associated with common manifold means (7) for feeding fuel and adapted to implement a regeneration strategy using at least one post-injection of fuel into the cylinders, is characterized in that it includes means (8) for detecting a regeneration request (req.RG)), means (9) for detecting when the engine is idling, means (11) for acquiring the temperature downstream from the catalyst-forming means, means (8) for determining, on the basis of said temperature, a maximum quantity of fuel to be injected when post-injections take place while the engine is idling on the basis of said temperature, and means (7, 8) for progressively reducing post-injection as soon as the quantity of fuel injected has reached the maximum quantity.

20 Claims, 1 Drawing Sheet

SYSTEM FOR ASSISTING THE REGENERATION OF DEPOLLUTION MEANS INTEGRATED IN AN EXHAUST LINE OF A DIESEL-ENGINED VEHICLE

BACKGROUND OF THE INVENTION

The present invention relates to a system for assisting in regenerating depollution means associated with means forming an oxidation catalyst integrated in an exhaust line of a diesel-engine motor vehicle.

More particularly, the invention relates to a system in which the engine is associated with means comprising a common manifold for feeding fuel to the cylinders of the engine and adapted, at constant torque, to implement a strategy of regeneration by injecting fuel in to the cylinders using at least one post-injection.

While depollution means, e.g. a particle filter, are being regenerated, periods during which the driver's foot on the vehicle accelerator is lifted (no fuel injection in normal operation), and periods of engine idling (exhaust temperature very low) are problematic since they cause a drop in the temperature of the exhaust, i.e. of the exhaust line and the elements included therein.

The use of one of more post-injections during these periods in the life of the engine enables the temperature drop of the exhaust line to be limited, by relying on the catalytic conversion of the hydrocarbons (HCs) produced by combustion of the poet-injection(s) into the engine.

Nevertheless, those strategies rely on the catalyst-forming means operation exothermally, where said means are considered as being activated and comprise, for example, an oxidation catalyst or a NOx trap with a CO/HC oxidation function.

During periods while the engine is returning to idling, after the foot on the accelerator has been raised, there is not main injection nor any pilot injection, so the or each post-injection does not burn in the cylinder since it does no more than vaporize fuel in the form of HCs for conversion by the catalyst-forming means.

The inlet temperature at the oxidation catalyst-forming means is thus very low in spite of the exothermal nature of the catalytic combustion of the HCs delivered by the or each post-injection, so the front face of the catalyst-forming means cool down progressively and its conversion activity runs down progressively.

While the engine is idling, and in spite of using one or more post-injections, the temperature that the inlet to the catalyst-forming means is relatively low. The strategy of post-injection while idling also relies on catalytic conversion of the HCs produced by the combustion of the post-injection(s) into the engine. In spite of this catalytic exothermic reaction, the front face of the catalyst-forming means cools down progressively and its conversion activity runs down progressively.

During a prolonged period of idling, it can happen that the catalyst-forming means are thus no longer sufficiently active to convert all of the HCs, which leads to HC peaks downstream from the catalyst-forming means, and even to blue fumes and/or exhaust odors.

Furthermore, the use of post-injections leads to fuel diluting the lubricating oil, thereby degrading its lubricating properties, and in particular reducing its viscosity, which can lead to engine damage if the viscosity becomes too low.

BRIEF SUMMARY OF THE INVENTION

The object of the invention is thus to solve those problems.

To this end, the invention provides a system for providing assistance in the regeneration of depollution means associated with oxidation catalyst-forming means, the means being integrated in an exhaust line of a diesel-engine motor vehicle in which the engine is associated with common manifold means for feeding the cylinders of the engine with fuel, and being adapted, at constant torque, to implement a strategy of regeneration by injecting fuel into the cylinders in at least one post-injection, the system being characterized in that it comprises:

means for detecting a regeneration request and thus a request for post-injection;

means for detecting a period in which the engine is idling;

means for acquiring the temperature downstream from the catalyst-forming means;

means for determining a maximum quantity of fuel to be injected during post-injection while the engine is idling, on the basis of said temperature; and reduction means for progressively reducing the or each post-injection as soon as the quantity of fuel that has been injected reaches the predetermined maximum quantity.

According to other characteristics:

the reduction means are adapted to reduce the or each post-injection in application of a calibratable slope;

the depollution means comprise a particle filter;

the depollution means comprise a NOx trap;

the fuel includes an additive for becoming deposited together with the particles with which it is mixed on the depollution means in order to facilitate regeneration thereof;

the fuel includes an additive forming a NOx trap; and the engine is associated with a turbocharger.

The invention can be better understood on reading the following description given purely by way of example and made with reference to the accompanying drawing, in which:

DETAILED DESCRIPTION OF THE DRAWING

Figure 1:
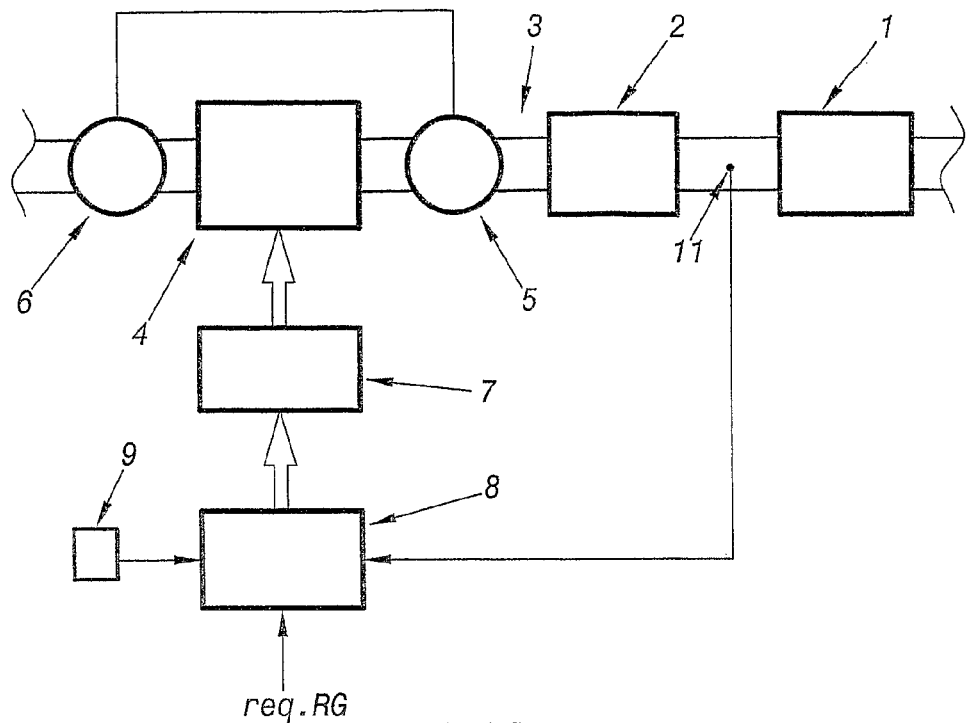
FIG. 1 is a block diagram showing the general structure of a system of the invention for providing assistance in regeneration.

FIG. 1 shows the general structure of a system for providing assistance in regenerating depollution means given overall reference 1 in the figure, and associated with oxidation catalyst-forming means given overall reference 2, being integrated in an exhaust line 3 of a motor vehicle diesel engine 4.

The engine may be associated with a turbocharger, and under such circumstances the turbine portion 5 thereof is also associated with the exhaust line, while the compressor portion 6 of the turbocharger is placed upstream of the engine.

Furthermore, the engine is also associated with means 7 constituting a common manifold for feeding fuel to the cylinders of the engine and adapted, at constant torque, to implement a strategy of regeneration by injecting fuel into the cylinders in at least one post-injection, in conventional manner.

These means are controlled by a pilot unit given overall reference 8 and adapted to detect a regeneration request req.RG, e.g. as issued by a supervisor of the depollution means, thus constituting a request for post-injection, the unit being connected to means 9 for detecting a period in which the engine is idling.

These means may have any suitable structure.

Furthermore, the pilot unit 8 is also connected to means for acquiring the temperature downstream from the catalyst-forming means 2, such acquisition means being given overall reference 11.

These means can comprise any suitable temperature sensor.

Figure 2:
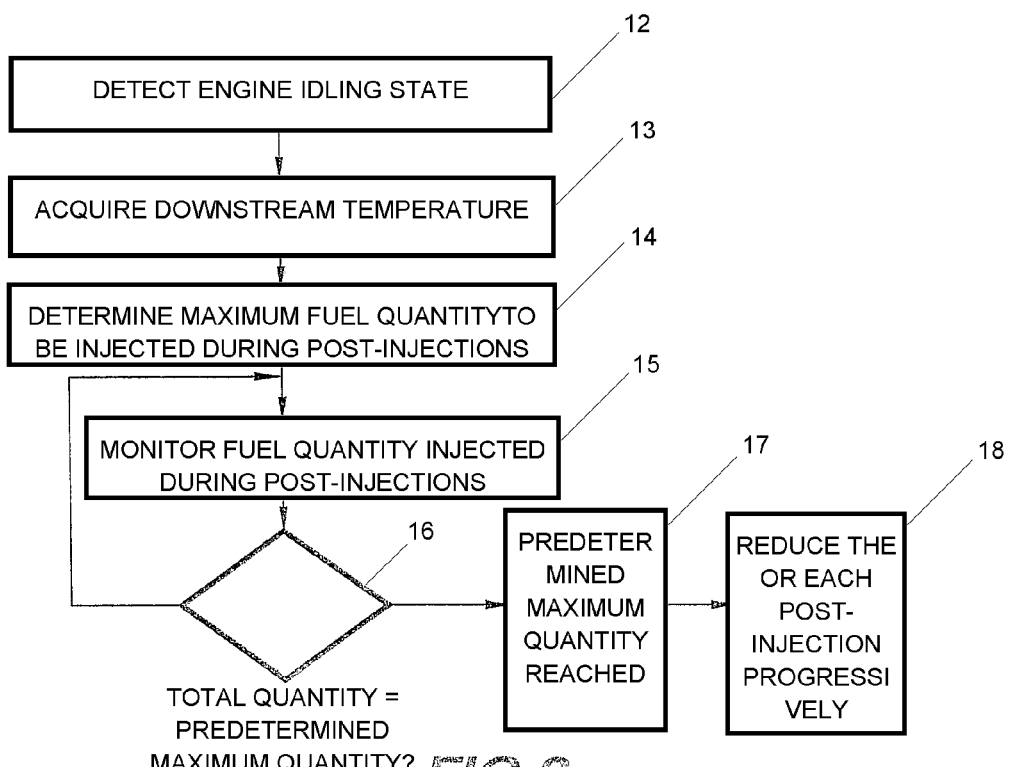
FIG. 2 is a flow chart showing its operation.

Thus, on detecting a request for regeneration and thus for post-injection, the pilot unit 8 can also detect that the engine is in an idling state, as shown by step 12 in FIG. 2.

The unit 8 is then adapted to acquire the temperature downstream from the catalyst-forming means during step 13 and to determine a maximum quantity of fuel to be injected during the post-injections while the engine is idling, on the basis of this temperature and determined in a step 14.

The unit 8 then acts in steps 15 and 16 to monitor the quantity of fuel injected during the post-injections and it detects the moment when said quantity of injected fuel reaches the predetermined maximum quantity.

In the even of the quantity of injected fuel reaching the predetermined maximum quantity while the engine is idling, as represented by step 17, the pilot unit is adapted to reduce the or each post-injection progressively, at rate that can be calibrated at 18, for example.

It should also be observed that such a system can operate with depollution means constituted by a particle filter, or a NOx trap, and an additive for depositing together with the particles with which it is mixed on the depollution means in order to facilitate their regeneration can also be mixed with the fuel in conventional manner to lower the combustion temperature of soot traps therein.

In conventional manner, said additive is present in the particles after combustion of the additive-containing fuel in the engine.

It is also possible to envisage using an additive constituting a NOx trap.

With such a structure, it can thus be seen that the quantity of fuel that is allowed for post-injection during a period of idling is capped by a maximum quantity.

This maximum quantity is present in the form of a supply which is emptied during the period of idling in the regeneration period. This supply is reinitialized at the end of the period.

Thus, the system makes it possible to limit the quantities that are post-injected while idling when the temperature levels in the exhaust line are the least favorable.

By limiting the total quantity of fuel that is post-injected during this period, which is not the most effective from the point of view of regenerating the depollution means, the amount of effective post-injection time is optimized and dilution of the lubricating oil of the engine with fuel is limited.

Finally, this also makes it possible to limit the risk of the oxidation function stopping suddenly, which would lead to a deficit in conversion of HCs and thus to an escape of HC in the exhaust that could lead to fumes and/or odors.

Naturally, other embodiments can be envisaged.

Thus, for example, the depollution means and the oxidation catalyst-forming means may be integrated in a single element, in particular on a common substrate.

By way of example, a particle filter integrating the oxidation function could be envisaged.

Similarly, a NOx trap integrating such an oxidation function could also be envisaged, regardless of whether it includes an additive.

This function of oxidation and/or NOx trapping can be performed by an additive mixed with the fuel, for example.

The invention claimed is:

1. A system for providing assistance in the regeneration of depollution means associated with oxidation catalyst-forming means, the means being integrated in an exhaust line of a motor vehicle diesel engine and in which the engine is associated with common manifold means for feeding the cylinders of the engine with fuel, and being adapted at constant torque to implement a strategy of regeneration by injecting fuel into the cylinders in at least one post-injection, the system comprising:

means for detecting a regeneration request and thus a request for post-injection;

means for detecting a period in which the engine is idling;

means for acquiring the temperature downstream from the catalyst-forming means;

means for determining a maximum quantity of fuel to be injected through post-injections during this period by implementation of the strategy of regeneration, on the basis of said temperature; and reduction means for progressively reducing the or each post-injection as soon as the total quantity of fuel that has been injected through post-injections since the start of the post-injections during this period reaches the predetermined maximum quantity.

2. A system according to claim 1, wherein the reduction means are adapted to reduce the or each post-injection in application of a calibratable slope.

3. A system according to claim 1, wherein the depollution means comprise a particle filter.

4. A system according to claim 1, wherein to depollution means comprise a NOx trap.

5. A system according to claim 1, wherein the fuel includes a additive for becoming deposited together with the particles with which it is mixed on the depollution moms in order to facilitate regeneration thereof.

6. A system according to claim 1, wherein the fuel includes a additive firming a NOx trap.

7. A system according to claim 1, wherein the engine is associated with a turbocharger.

8. A system according to claim 1, wherein the catalyst-forming moms comprises an oxidation catalyst.

9. A system according to claim 1, wherein the catalyst-forming means comprise a NOx trap with a CO/HC oxidation function.

10. A system according to claim 1, wherein the period in which the engine is idling includes a period in which the acceleration pedal is raised.

11. Method of providing assistance in the regeneration of depollution means associated with oxidation catalyst-forming means, the means being integrated in an exhaust line of a motor vehicle diesel engine and the engine being associated with common manifold means for feeding the cylinders of the engine with fuel, and being adapted at constant torque to implement a strategy of regeneration by injecting fuel into the cylinders in at least one post-injection, the method comprising:

detecting a regeneration request and thus a request for post-injection;

detecting a period in which the engine is idling;

acquiring the temperature downstream from the catalyst-forming means;

determining a maximum quantity of fuel to be injected through post-injections during this period by implementation of the strategy of regeneration, on the basis of said temperature;

monitoring the total quantity of fuel injected through post-injections since the staff of the post-injections during this period and detecting a moment when the total quantity of injected fuel reaches the predetermined maximum quantity; and progressively reducing the or each post-injection as soon as the total quantity of fuel that has been injected through post-injections since the start of the post-injections during this period reaches the predetermined maximum quantity.

12. A method according to claim 11, wherein the reduction step comprises reducing the or each post-injection in application of a calibratable slope.

13. A method according to claim 11, wherein the depollution means comprise a particle filter.

14. A method according to claim 11, wherein the depollution means comprise a NOx trap.

15. A method according to claim 11, wherein the fuel includes an additive for becoming deposited together with the particles with which it is mixed on the depollution means in order to facilitate regeneration thereof.

16. A method according to claim 11, wherein the fuel includes an additive forming a NOx trap.

17. A method according to claim 11, wherein the engine is associated with a turbocharger.

18. A method according to claim 11, wherein the catalyst-forming means comprises an oxidation catalyst.

19. A method according to claim 11, wherein the catalyst-forming means comprise a NOx trap with a CO/HC oxidation function.

20. A method according to claim 1, wherein the period of idling includes a period in which the acceleration pedal is raised.

* * * * *